July 9, 1957  E. K. NELSON ET AL  2,798,690
REMOVABLE U-PIN PISTON VALVE
Filed Oct. 30, 1953
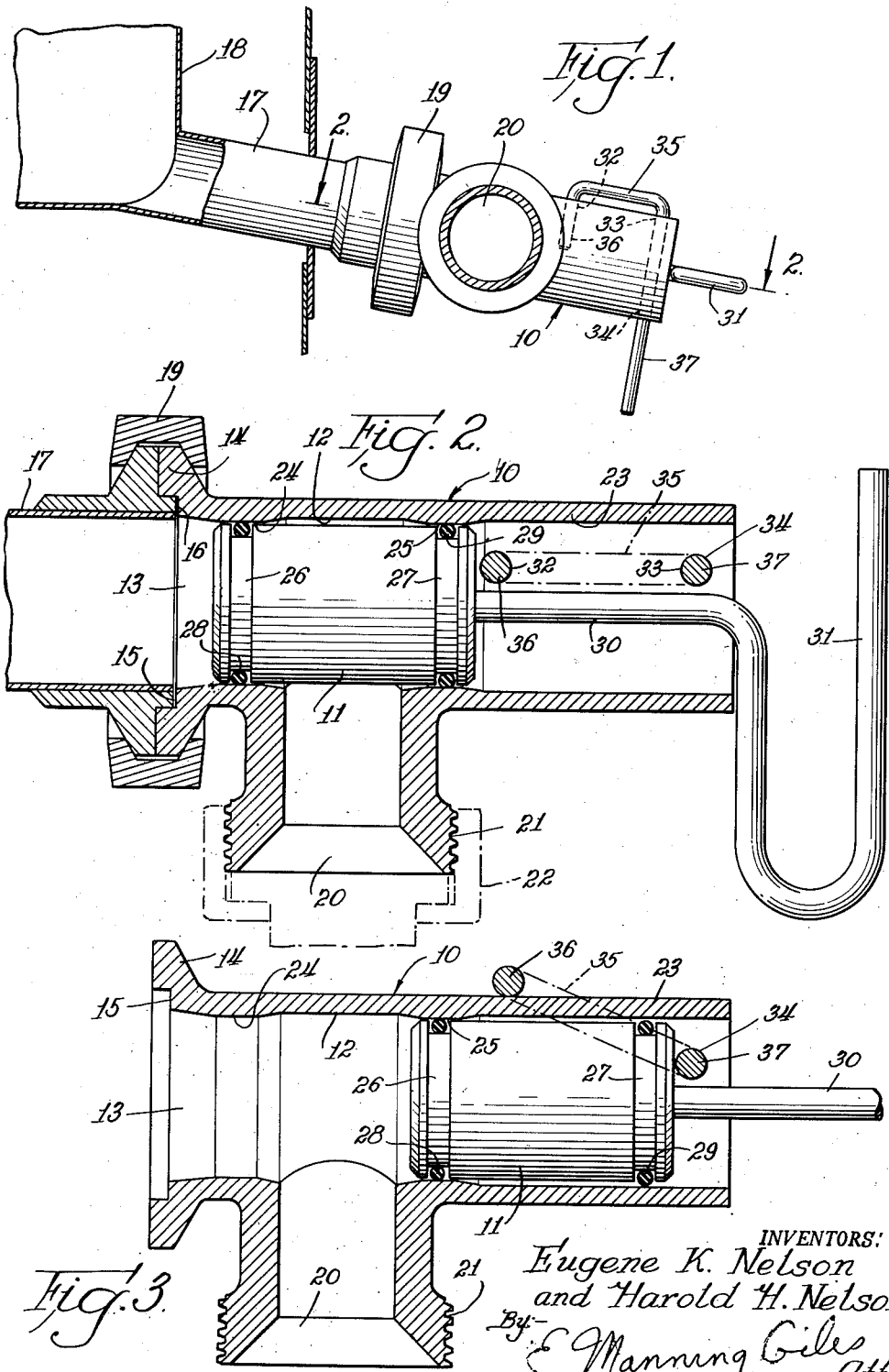
INVENTORS:
Eugene K. Nelson
and Harold H. Nelson
By E. Manning Giles
Atty

United States Patent Office 2,798,690
Patented July 9, 1957

2,798,690

REMOVABLE U-PIN PISTON VALVE

Eugene K. Nelson and Harold H. Nelson, Cedar Rapids, Iowa, assignors to Cherry-Burrell Corporation, Chicago, Ill., a corporation of Delaware Application October 30, 1953, Serial No. 389,404

2 Claims. (Cl. 251—111)

Our invention relates to a piston valve and has reference more particularly to such a valve wherein a removable U-pin is employed, one leg of which serves as a back-stop against which the piston can be retracted for opening and the other leg of which serves to prevent accidental displacement of the piston when in the closed position.

The valve of our invention is disclosed herein as embodying sanitary design features, and these features render it especially suitable for use with milk storage tanks as a drainage valve. However, the unique characteristics of our valve make it advantageous for many uses where a non-throttling valve is desired.

The principal objects of our invention are to provide a sanitary piston valve of simple design which may be used alternatively in the full open or full closed position; to preclude accidental displacement of the valve from the closed position; to design such a valve composed of a minimum number of parts which may be diassembled and reassembled conveniently and rapidly for cleaning; to employ therewith indexing holes through which a suitable U-pin may be engaged to hold the piston in its normally closed position; to provide such U-pin with an elongated leg which can remain engaged in one of said indexing holes when the shorter leg is removed from the other, thus providing a second stop against which the piston may be retracted to full open position; to develop such a valve which involves no metal-to-metal sliding contact and which therefore may be expected to afford long, trouble-free life; and to provide such a valve which is moderate in cost and convenient to use, these and other objects being accomplished as hereinafter described, reference being had to the accompanying drawing in which:

Fig. 1 is a side view of a piston valve embodying our invention;

Fig. 2 is a sectional view on the line 2—2 of Fig. 1 and shows the piston valve in fully extended position; and Fig. 3 is a view similar to Fig. 2 except that it shows the piston in fully retracted position.

Referring now to the drawing, our piston valve consists of a substantially tubular valve body designated generally by the reference numeral 10 and a piston 11 mounted within said valve body 10 for reciprocal movement within a central bore 12 thereof.

The valve body 10 is provided with an inlet 13 at one end thereof communicating with the central bore 12, the inlet 13 having a peripheral enlargement 14 and a seat 15 adapted to engage in mating relation with a complementary seat 16 on a drainage duct 17 from a farm tank 18. The respective seats 15 and 16 are held in engagement by a clamping collar 19.

The valve body 10 is provided with an outlet 20 at the side thereof and communicating with the central bore 12 at approximately right angles thereto as shown in Fig. 2. The outlet 20 is provided with external threads 21 to permit convenient attachment thereto of a conventional sanitary coupling 22 as indicated by the phantom lines in Fig. 2.

At the end of the valve body 10 remote from the inlet 13 our valve is provided with an extended cylindrical portion 23 into which the piston 11 may be retracted when the valve is in the open position so as to permit communication between the inlet 13 and the outlet 20.

The central bore 12 is provided with a restriction of reduced diameter between the inlet 13 and the outlet 20 to provide a seating surface 24, and is similarly provided with a restriction of reduced diameter between the outlet 20 and the extended portion 23 to provide a corresponding seating surface 25.

The piston 11 has a peripheral channel 26 at the end toward the inlet 13 and may optionally be provided with a similar peripheral channel 27 at the end toward the extended cylindrical portion 23. Resilient sealing members 28 and 29 are seated in the respective peripheral channels 26 and 27. The said sealing members 28 and 29 are preferably O-rings and may be made of neoprene rubber or the like, O-rings being referred to hereafter for illustrative purposes. The said O-rings 28 and 29 are of greater diameter than the depth of the peripheral channels 26 and 27 so that the outer surfaces thereof extend beyond the edges of the piston 11.

The piston 11 is of slightly reduced diameter with respect to the seating surfaces 24 and 25 so that it may move freely therethrough but the O-rings 28 and 29 are of sufficient thickness to engage said seating surfaces 24 and 25, respectively, and to be compressed thereby within the channels 26 and 27. The seating surfaces 24 and 25 are spaced at substantially the same distance apart as the peripheral channels 26 and 27 so that when the piston 11 is in the closed position the O-ring 28 is engaged in sealing relation between the seating surface 24 and the peripheral channel 26 so that no liquid at the inlet side of the valve may pass the piston 11. Likewise, the O-ring 29 is engaged in sealing relation between the seating surface 25 and the peripheral channel 27. The channel 27 and the O-ring 29 are not essential to our piston valve construction but they are considered desirable for most efficient operation of the valve.

When the piston 11 is in the fully retracted position as shown in Fig. 3, the O-ring 28 is engaged in sealing relation between the peripheral channel 26 and the seating surface 25 so that liquid entering the inlet 13 and passing through the central bore 12 of our valve is required to pass through the outlet 20 and cannot penetrate beyond the piston 11 into the extended cylindrical portion 23.

As has been noted, the peripheral channel 27 and the O-ring 29 are optional, as the O-ring 28 provides the necessary sealing effect both in the closed and in the open positions of the valve. The O-ring 29, however, serves to seal off the interior of the central bore 12 when the valve is closed and may be desired for this purpose.

For convenient operation of our valve, the piston 11 has an axial extension 30, the end of which is looped downwardly at approximately right angles and then curved upwardly at approximately a 180° angle to provide a handle 31. The inner edge of the handle 31 is adapted to abut against the outer edge of the extended cylindrical portion 23 when the piston 11 is in the closed position so as to provide a stop which insures accurate positioning of the peripheral channel 26 in alignment with the seating surface 24 so as to compress the O-ring 28 therebetween.

The extended cylindrical portion 23 is provided at the top thereof with two spaced holes 32 and 33 in parallel alignment with respect to the axis of the central bore 12 and an outer edge of said extended cylindrical portion 23 and disposed therebetween.

One of said holes 32 is located adjacent the seating surface 25, and the other hole 33 is located adjacent the end of the extended cylindrical portion 23. A third hole 34 is disposed opposite the hole 33 in chordwise alignment with respect thereto.

The said holes 32, 33, and 34 are adapted to receive the respective legs of a U-shaped pin 35, the shorter leg 36 of said pin 35 being adapted for insertion in the hole 32 and the longer leg 37 of said pin 35 being adapted for insertion through the aligned holes 33 and 34.

The shorter leg 36 of the pin 35, when in position in the hole 32, serves as a back-stop against which the handle end of the piston 11 may bear when said piston 11 is in the closed position and pressure is exerted thereagainst at the inlet 13. Thus the pin 35 serves to prevent displacement of the piston 11 when the valve is in the closed position as shown in Fig. 2.

When it is desired to open the valve, to the position shown in Fig. 3, the pin 35 is raised sufficiently to free the shorter leg 36 thereof from the hole 32. Preferably, the longer leg 37 is of such length as to remain engaged in both the holes 33 and 34 when the shorter leg 36 is freed from the hole 32. The pin 35 may then be lowered with the shorter leg 36 outside the extended cylindrical portion and the longer leg 37 still engaged in the holes 33 and 34. Thus the longer leg 37 serves as a back-stop against which the handle end of the piston 11 may be retracted when the valve is opened. The handle 31 may then be pulled outwardly to retract the piston as soon as the shorter leg 36 is removed from the hole 32, and this back-stop arrangement insures positive positioning of the piston 11 in the open position simply by pulling the handle 31 as far as it will go. The piston 11 may of course be fully removed for cleaning by completely removing the pin 35 from the extended cylindrical portion 23.

For positively positioning the piston 11 when it is pushed into closed position, the handle 31 is looped at the end as previously described and as shown in Fig. 2, so that the looped portion of the handle bears against the outer end of the extended cylindrical portion 23 and the latter serves as a stop when the piston 11 is pushed inwardly to the closed position.

It will be understood that the design of our valve as herein described is of utmost simplicity. The positioning both in the open and in the closed positions is positive and protected against accidental displacement, yet by simple removal of the U-pin 35, the piston may be removed for cleaning. There are no metal against metal contact surfaces within the valve, the sliding contact being of rubber O-rings 28 and 29 on the metal interior of the seating surfaces 24 and 25. The O-rings 28 and 29 are readily replaceable so as to make sure that the sealing will always be positive and efficient.

We contemplate that the sanitary valve of the type described herein would normally be made of stainless steel, but it will be understood that the valve and its components may be made of any suitable material, and while we have shown and described our invention in a preferred form, we are aware that various changes can be made therein without departing from the spirit of our invention, the scope of which is to be determined by the appended claims.

We claim:

1. A valve of the class described comprising a hollow valve body, a piston retractably mounted therein, a tubular valve body extension into which said piston may be retracted, and means for selectively limiting retraction thereof comprising an inner hole in said extension adjacent said valve body, an outer hole spaced longitudinally therefrom remote from said valve body, an auxiliary hole aligned in substantially chordwise relation opposite said outer hole, and a U-pin having a short leg removably engageable with said inner hole and a long leg engageable through said outer hole and said auxiliary hole.

2. A valve of the class described comprising a hollow valve body, a piston retractably mounted therein, a tubular valve body extension into which said piston may be retracted, a stem on said piston extending outwardly therefrom beyond said extension, and means selectively limiting retraction thereof comprising an inner hole in said extension adjacent said valve body, an outer hole spaced longitudinally therefrom remote from said valve body, an auxiliary hole aligned in substantially chordwise relation opposite said outer hole, and a U-pin having a short leg removably engageable with said inner hole and a long leg engageable through said outer hole and said auxiliary hole, and said stem having a laterally offset portion remote from the piston and adapted to engage the extension when said piston is pushed into said valve body.

References Cited in the file of this patent

UNITED STATES PATENTS

| | | |
|---|---|---|
| 1,824,157 | King | Sept. 22, 1931 |
| 2,365,752 | Edwards | Dec. 26, 1944 |

FOREIGN PATENTS

| | | |
|---|---|---|
| 13,261 | France | of 1855 |